US011349393B2

(12) United States Patent
Hashim et al.

(10) Patent No.: US 11,349,393 B2
(45) Date of Patent: May 31, 2022

(54) WIDE INPUT VOLTAGE LOW IQ SWITCHING CONVERTER

(71) Applicant: Texas Instruments Incorporated, Dallas, TX (US)

(72) Inventors: Ahmed Essam Hashim, Gilbert, AZ (US); Sang Yong Lee, Chandler, AZ (US); Uzair Mohammed, Chandler, AZ (US); Eric Wayne Tisinger, Chandler, AZ (US)

(73) Assignee: Texas Instruments Incorporated, Dallas, TX (US)

( * ) Notice: Subject to any disclaimer, the term of this patent is extended or adjusted under 35 U.S.C. 154(b) by 70 days.

(21) Appl. No.: 16/996,207

(22) Filed: Aug. 18, 2020

(65) Prior Publication Data

US 2022/0060108 A1 Feb. 24, 2022

(51) Int. Cl.
*H02M 3/158* (2006.01)
*H02M 1/08* (2006.01)
*H02M 3/157* (2006.01)
*H02M 1/00* (2006.01)

(52) U.S. Cl.
CPC ............. *H02M 3/158* (2013.01); *H02M 1/08* (2013.01); *H02M 3/157* (2013.01); *H02M 1/0009* (2021.05)

(58) Field of Classification Search
CPC ........ H02M 3/158; H02M 3/157; H02M 1/08; H02M 1/0009
See application file for complete search history.

(56) References Cited

U.S. PATENT DOCUMENTS

2007/0090817 A1* 4/2007 Yee ................ H02M 3/156
323/282
2015/0244267 A1* 8/2015 Park ................ H02M 3/158
345/76

* cited by examiner

*Primary Examiner* — Kyle J Moody
*Assistant Examiner* — Jye-June Lee
(74) *Attorney, Agent, or Firm* — Mark A. Valetti; Charles A. Brill; Frank D. Cimino

(57) ABSTRACT

A system has an input voltage source, a power stage coupled to the input voltage source, a load coupled to an output node of the power stage and a control circuit, the control circuit implemented on a semiconductor die and including: an error amplifier having a first input, a second input and an output; a voltage divider coupled to the output node and configured to provide an output voltage sense value to the first input of the error amplifier; and a programmable reference voltage circuit with an output coupled to the second input of the error amplifier. The programmable reference voltage circuit includes: a reference voltage source; scaling circuit components between the reference voltage source and the second input of the error amplifier; and a switch between the reference voltage source and the second input of the error amplifier. The control circuit is coupled to the power stage and is configured to generate a control signal for switches of the power stage.

20 Claims, 4 Drawing Sheets

WIDE INPUT VOLTAGE LOW IQ SWITCHING CONVERTER

BACKGROUND

The proliferation of consumer electronic devices and integrated circuit (IC) technology has resulted in the commercialization of IC products. As new consumer electronic devices are developed and IC technology advances, new IC products are commercialized. One example IC product that is needed in electronic devices (such as personal electronic devices, cell phones, wearable devices, industrial equipment and automobiles) is a control circuit for a switching converter power stage.

Boost regulators are at a disadvantage to buck regulators since any load current output from a boost regulator is gained up when reflected to the input source. In contrast, in a buck regulator, the current is divided down as it reflects to the input source (any output current is measured as a lower input current). In an example switching converter for an automotive application, a limit of 100 kΩ is set on external resistors to limit the effect of board leakages. This means the feedback resistors can be running 100 s of uA, which is then reflected back to the input source as potentially mA of current.

SUMMARY

In accordance with at least one example of the disclosure, a system has an input voltage source, a power stage coupled to the input voltage source, a load coupled to an output node of the power stage and a control circuit. The control circuit is implemented on a semiconductor die and comprises: an error amplifier having a first input, a second input and an output; a voltage divider coupled to the output node and configured to provide an output voltage sense value to the first input of the error amplifier; and a programmable reference voltage circuit with an output coupled to the second input of the error amplifier. The programmable reference voltage circuit includes: a reference voltage source; scaling circuit components between the reference voltage source and the second input of the error amplifier; and a switch between the reference voltage source and the second input of the error amplifier. The control circuit is coupled to the power stage and is configured to generate a control signal for switches of the power stage.

In accordance with at least one example of the disclosure, a switching converter circuit comprises: a power stage having an output and at least one switch, each switch having a control terminal; a control circuit having a control signal output coupled to the control terminal of each of the at least one switch. The control circuit comprises an integrated circuit (IC) having: an error amplifier; a voltage divider coupled to an output of the power stage and configured to provide an output voltage sense value to a first input of the error amplifier; and a programmable reference voltage circuit with an output coupled to a second input of the error amplifier. The programmable reference voltage circuit includes: a reference voltage source; scaling circuit components between the reference voltage source and the second input of the error amplifier; and a switch between the reference voltage source and the second input of the error amplifier.

In accordance with at least one example of the disclosure, a control circuit IC for a switching converter comprises: an error amplifier; a voltage divider coupled to a first input of the error amplifier; and a programmable reference voltage circuit with an output coupled to a second input of the error amplifier. The programmable reference voltage circuit includes: a reference voltage source; scaling circuit components between the reference voltage source and the second input of the error amplifier; and a switch between the reference voltage source and the second input of the error amplifier.

BRIEF DESCRIPTION OF THE DRAWINGS

For a detailed description of various examples, reference will now be made to the accompanying drawings in which.

DETAILED DESCRIPTION

Described herein are control circuit topologies for a switching converter power stage and related systems. In accordance with some example embodiments, a control circuit for a switching converter power stage includes an integrated circuit (IC) having an error amplifier and a voltage divider coupled to the output node. The voltage divider is configured to provide a voltage to an input of the error amplifier that is representative of the output voltage (VOUT). The IC also includes a programmable reference voltage circuit with an output coupled to another input of the error amplifier. The programmable reference voltage circuit includes a reference voltage source and scaling circuit components. The scaling circuit is situated between the reference voltage source and the second input of the error amplifier. The programmable reference voltage circuit also includes a switch between the reference voltage source and the second input of the error amplifier.

In some example embodiments, the scaling circuit components include IC pins to connect to a voltage divider external to the IC. In these example embodiments, the reference voltage (VREF) from the reference voltage source is output via a first pin of the IC to allow the IC user to program VOUT by directly programming the error amplifier reference using an external resistive divider coupled to the first pin and the second pin, which is coupled to the error amplifier reference input. This allows the IC user to program any VOUT that is desired without limiting VOUT to discrete levels. Because the external voltage divider is applied to VREF (and not VOUT), the external voltage divider is dividing a lower reference (e.g., 1.2V) compared to a traditional approach where the voltage divider is applied to VOUT (e.g., a 12V or 24V output). Hence, the current in the voltage divider is reduced by at least 10× compared to a traditional converter using a voltage divider for VOUT. In this example, the quiescent current (Iq) still comes from VOUT and is reflected back to VIN by the boost gain ratio.

In other example embodiments, the programmable reference voltage circuit is configured to sample-and-hold the scaled reference voltage and to shut down the reference voltage source circuit in a low power mode, which reduces Iq of the control circuit. In other example embodiments, the scaling circuit components include a digital scaling circuit and a pin configured to receive a digital control signal from a source external to the IC. To provide a better understanding, various control circuit options and related switching converter systems or scenarios are described using the figures as follows.

Figure 1:
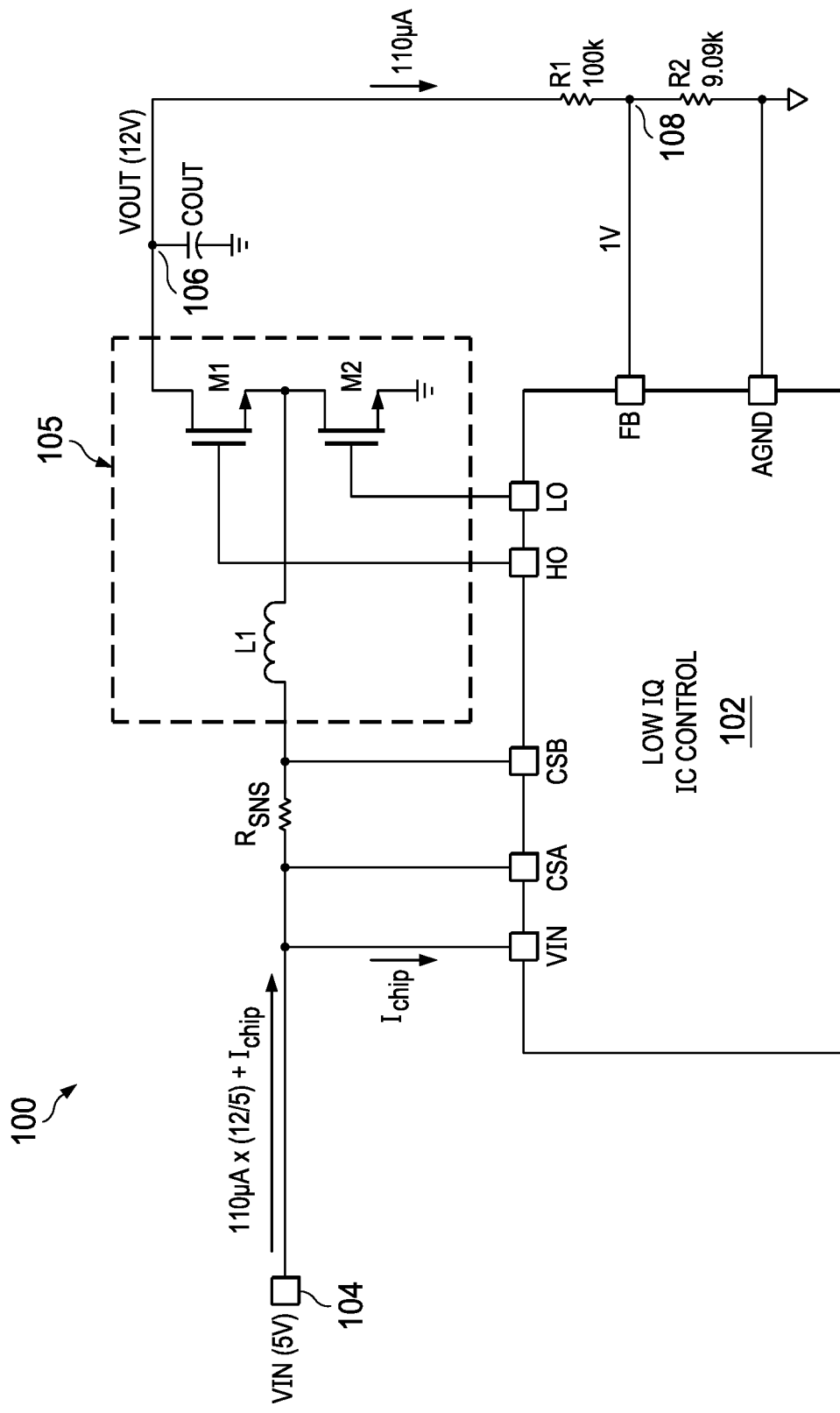
FIG. 1 is a diagram showing a switching converter circuit in accordance with conventional circuitry.

FIG. 1 is a diagram showing a switching converter circuit 100 in accordance with conventional circuitry. As shown, the switching converter circuit 100 comprises a low Iq control IC 102 configured to provide control signals (HO and LO) to the high-side and low-side switches of a power stage 105. In FIG. 1, the power stage 105 corresponds to a boost converter power stage with an inductor (L1) and switches (M1 and M2), where HO controls M1 and LO controls M2. As shown, the power stage 105 is coupled between an input voltage (VIN) node 104 and an output voltage (VOUT) node 106. The switching converter circuit 100 also includes a sense resistor ($R_{SNS}$) between the VIN node 104 and the power stage 105. Also, the switching converter circuit 100 includes an output capacitor (COUT) coupled between the VOUT node 106 and a ground node. Coupled to the VOUT node 106 is a voltage divider formed by R1 (e.g., 100 kΩ) and R2 (e.g., 9.09 kΩ) in series, where the node 108 between R1 and R2 is coupled to a feedback (FB) pin of the control IC 102. As shown, the control IC 102 also includes a VIN pin, a first current sense (CSA) pin, a second current sense (CSB) pin, an HO pin, an LO pin, and an analog ground (AGND) pin.

In operation, the control IC 102 is configured to provide HO and LO drive/control signals based on the various parameters such as VIN, VOUT, the current sense values at the CSA and CSB pins, and the feedback value at the FB pin. In the example of FIG. 1, the values of R1 and R2 set the value of VOUT (e.g., 12V in FIG. 1 based on R1=100 kΩ and R2=9.09 kΩ). The voltage divider formed by R1 and R2 consumes significant current especially in automotive systems where the maximum resistance is restricted to 100 kΩ. In boost power stage topologies, such as the power stage 105, the current is multiplied by the boost ratio as it is reflected back to the input source. Accordingly, in the example of FIG. 1, Iq of the switching converter circuit 100 is equal to 110 uA×(12/5)+Ichip, where 110 uA is the quiescent current through R1 and R2, 12/5 is the boost ratio, and Ichip is the current consumption of the control IC 102. Here Iq corresponds to the system quiescent current, not including any load current, which is reflected to the input equivalent current since this is the drain on the source driving the input. One option to reduce the Iq of the switching converter circuit 100 involves integrating the voltage divider (R1 and R2) inside the control IC 102, but in doing so the output is harder to for the IC user to program the output voltage because the IC user cannot readily change the value of internal resistors. This is because internal resistors of the IC are presumably fixed in value, so there is no easy way for the customer to program the output voltage in a continuous analog fashion (usually done by programming an external divider). One option is to provide the customer with a few internal resistor options, however, this still does not allow continuous and analog programmability of the output voltage. Such limitations are very restricting to the end application.

Figure 2:
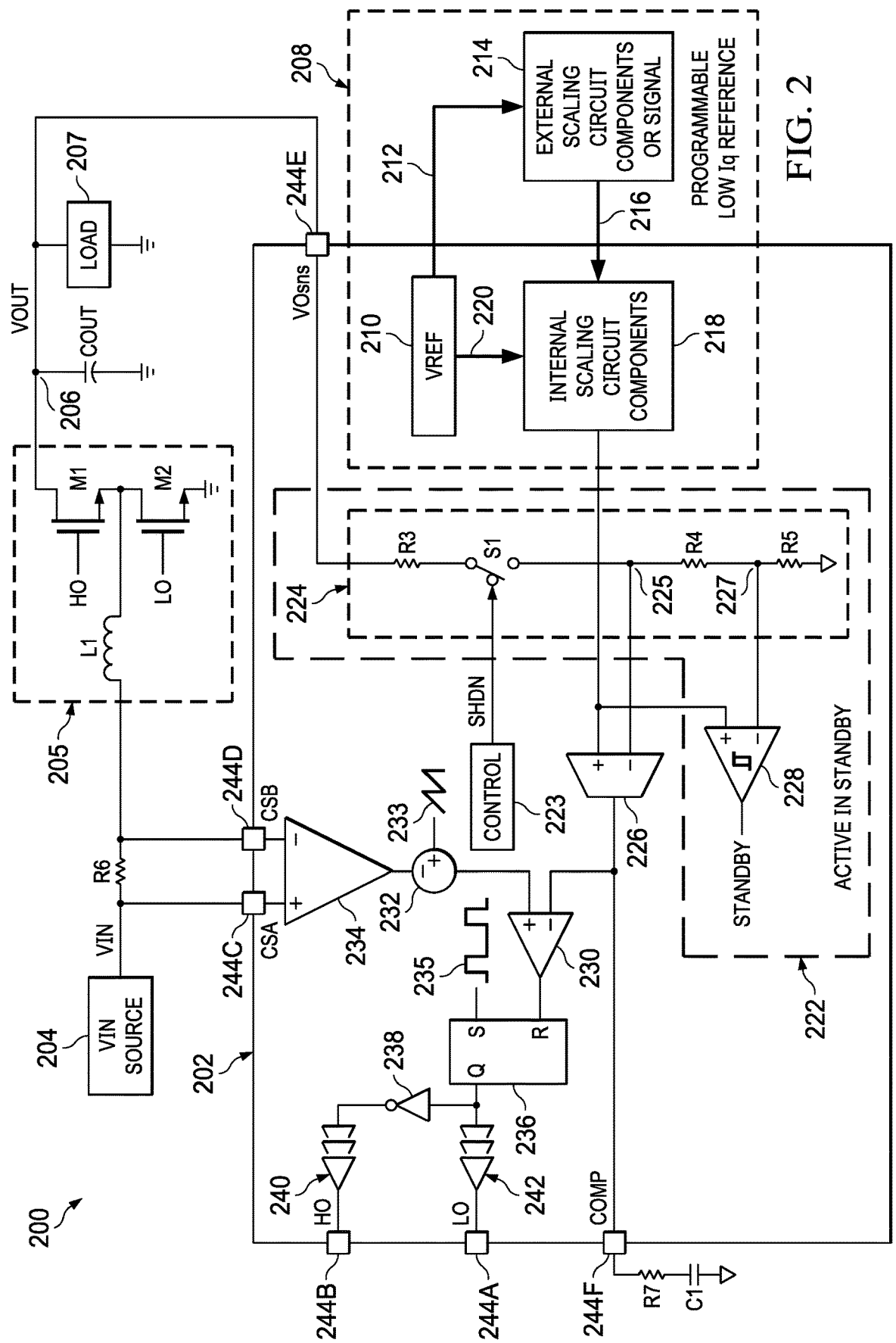
FIG. 2 is a diagram showing a system in accordance with an example embodiment.

FIG. 2 is a diagram showing a system 200 in accordance with an example embodiment. As shown, the system 200 includes a low Iq control IC 202 configured to provide control signals (HO and LO) to switches of a power stage 205. In FIG. 2, the power stage 205 corresponds to a boost converter power stage with an inductor (L1) and switches (M1 and M2), where HO controls M1 and LO controls M2.

In other example embodiments, the power stage 205 could have a buck converter topology, buck-boost converter topology, and/or another topology.

As shown, the power stage 205 is coupled between a VIN source 204 and a VOUT node 206. The system 200 also includes a sense resistor (R6) between the VIN source 204 and the power stage 205. Also, the system 200 includes an output capacitor (COUT) coupled between the VOUT node 206 and a ground node. Also, represented in FIG. 2 is a load 207 coupled to the VOUT node 206 and the ground node. Coupled to the VOUT node 106 is a sense pin (VOsns) 244E of the control IC 202. As shown, the control IC 202 also includes a HO pin 244A, a LO pin 244B, a CSA pin 244C, a CSB pin 244D, and a compensation (COMP) pin 244F.

In the example embodiment of FIG. 2, the control IC 202 includes an error amplifier 226 configured to compare a scaled VOUT sense value (from node 244E via a voltage divider 224 with R3, R4, and R5) with a scaled reference voltage. As shown, the voltage divider 224 includes an internal node 225 and a switch (S1) between R3 and R4, where S1 selectively disables providing the scaled VOUT sense value to a first (e.g., inverting) input of the error amplifier 226 based on a control signal (SHDN). The second (e.g., non-inverting) input of the error amplifier 226 is provided by a programmable low Iq reference circuit 208. In the example of FIG. 2, the programmable low Iq reference circuit 208 includes a reference voltage (VREF) source 210, internal scaling circuit components 218, and external scaling circuit components or signal 214. If the external scaling circuit components or signal 214 includes scaling components (e.g., a voltage divider), the reference voltage from the reference voltage source 210 is provided to the external scaling circuit components as represented by arrow 212. If the external scaling circuit components or signal 214 does not include scaling components (e.g., only a control signal is received), the reference voltage from the reference voltage source 210 is provided to the internal scaling circuit components 218 as represented by arrow 220. In either case, the second input of the error amplifier 226 selectively receives a scaled version of VREF from the programmable low Iq reference circuit 208. In some example embodiments, the programmable low Iq reference circuit 208 is turned off during a low power mode.

As shown, the control IC 202 also includes a comparator 228 having a non-inverting input coupled to the non-inverting input of the error amplifier 226 and an inverting input coupled to an internal node 227 of the voltage divider 224, where the internal node is between R4 and R5. The output of the comparator 228 is a control signal (STANDBY) used to disable the reference block and disconnect the external components after the programmed reference has been sampled and held by the internal holding circuitry (not shown?). In some example embodiments, the voltage divider 224 and the comparator 228 are components of an active circuit 222 that is active in low power mode (also called standby mode). As shown, the output of the error amplifier 226 is coupled to the COMP pin 244F. In the example of FIG. 2, a compensation resistor (R7) and capacitor (C1) are coupled in series between the COMP pin 244F and a ground node, where R7 and C1 form a compensation network for stability. The output of the error amplifier 226 is also coupled to the first (e.g., inverting) input of an operational amplifier 230. The second (e.g., non-inverting) input of the operational amplifier 230 is coupled to the output of a combine circuit 232 configured to combine a ramp signal 233 with the output of an operational amplifier 234 having its inputs coupled to the CSA pin 244C and the CSB pin 244D. The output of the operational amplifier 230 is coupled to the reset input of a set-reset latch 236, where the set input of the SR latch 236 receives a pulse width modulated (PWM) signal 235. The output of the SR latch 236 is provided via a buffer 242 to the LO pin 244A. As shown, the output of the SR latch 236 is also provided via an inverter 238 and a buffer 240 to the HO pin 244B. Alternatively, the Q output of SR latch 236 is provided, via buffer 242, to the LO pin 244A and the Q-bar output (not shown) of SR latch 236 is provided, via buffer 240, to HO pin 244B.

In operation, the control IC 202 is configured to generate control signals at the LO pin 244A and the HO pin 244B based on the current detected through R6 (using the operational amplifier 234), the ramp signal 233 (used for slope compensation in the peak current mode controller example of FIG. 2), PWM signal 235, and the output from the error amplifier 226. The benefit of the control IC 202 relative to other switching converter controllers is a reduced Iq while also supporting a programmable VOUT using the internal scaling circuit components 218 or the external scaling circuit components 214.

Figure 3:
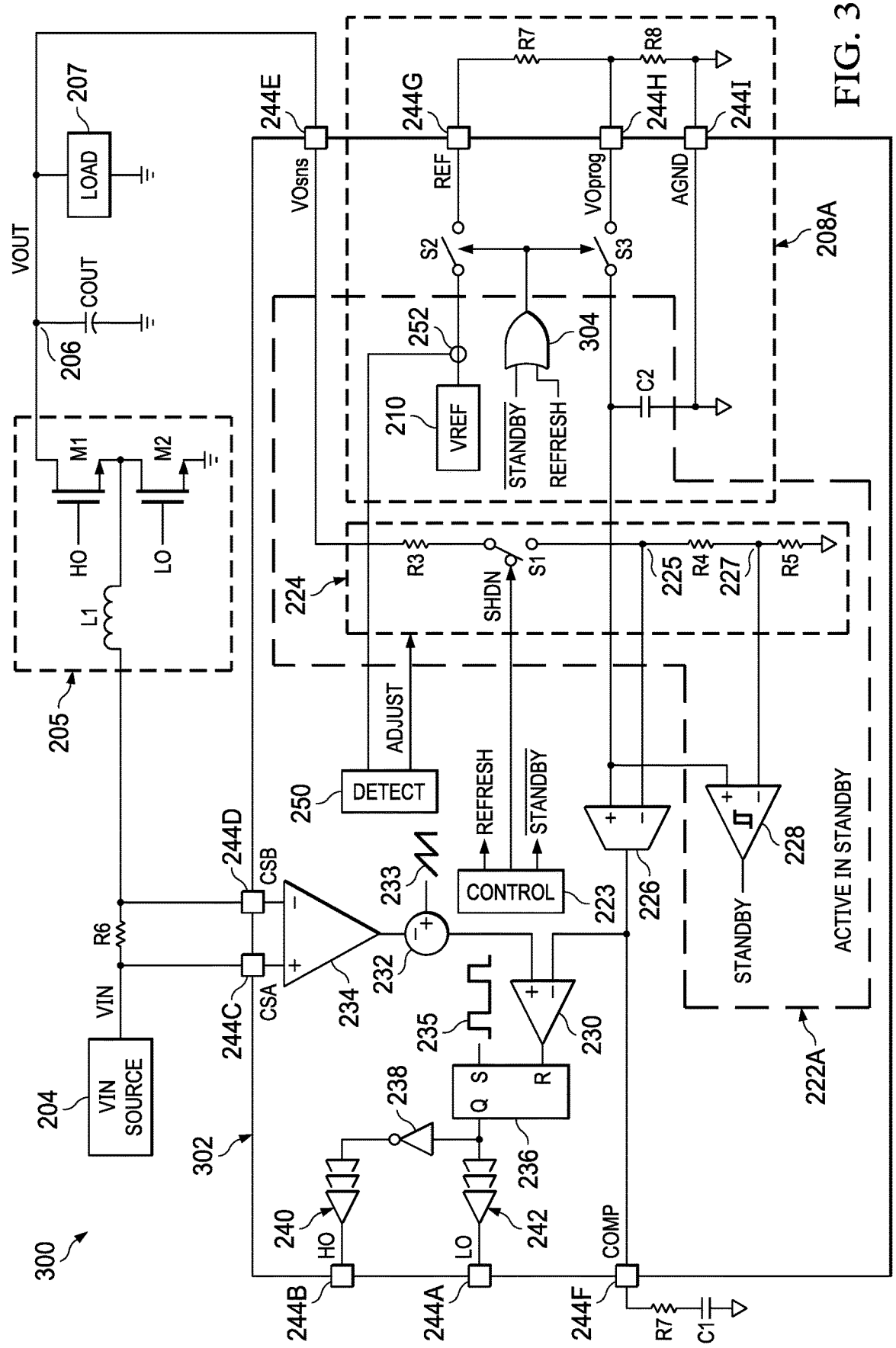
FIG. 3 is a diagram showing another system in accordance with an example embodiment.

FIG. 3 is a diagram showing converter system 300 in accordance with an example embodiment. As shown, the system 300 includes a low Iq control IC 302 (an example of the control IC 202 in FIG. 2) configured to provide control signals (HO and LO) to switches of the power stage 205. In FIG. 3, the power stage 205 corresponds to a boost converter power stage with L1, M1, and M2, where HO controls M1 and LO controls M2. In other example embodiments, the power stage 205 of FIG. 3 could have a buck converter topology, buck-boost converter topology, and/or another topology.

In the system 300 of FIG. 3, various other components external to the control IC 302 are represented such as the VIN source 204, COUT, and the load 207 described in FIG. 2. Also, the control IC 302 of FIG. 3 includes various components described for the control IC 202 of FIG. 2 such as the voltage divider 224, the error amplifier 226, the comparator 228, the operational amplifier 230, the combine circuit 232, the operational amplifier 234, the SR latch 236, the buffers 240 and 242, the inverter 238, the LO pin 244A, the HO pin 244B, the CSA pin 244C, the CSB pin 244D, the VOsns pin 244E, and the COMP pin 244F.

In the example embodiment of FIG. 3, the control IC 302 includes various components that are part of a programmable low Iq reference circuit 208A that are similar to the programmable low Iq reference circuit 208 in FIG. 2. As shown, the programmable low Iq reference circuit 208A includes the VREF source 210 coupled to a reference (REF) node 244G via a switch (S2). The programmable low Iq reference circuit 208A also includes VOUT program (VOprog) pin 244H coupled to the non-inverting input of the error amplifier 226 via switch (S3). The capacitor (C2) is connected between the non-inverting input of the error amplifier 226 and a ground node. The programmable low Iq reference circuit 208A also includes an analog ground (AGND) pin 244I coupled to the ground node, where the AGND pin 244I is coupled to a ground node external to the control IC 302. As shown, the programmable low Iq reference circuit 208A also includes an OR gate 304 with its output coupled to control S2 and S3. The inputs of the OR gate 304 include a Refresh signal and a $\overline{\text{Standby}}$ signal (called a standby bar signal, or an inverse standby signal). The Refresh signal is a signal that periodically enables the VREF source 210, the internal scaling circuit components 218, and the external scaling circuit components or signal 214 to refresh the value held on C2. This is done to mitigate any leakage by C2 to avoid going out of regulation over time.

In the example embodiment of FIG. 3, the Refresh signal, $\overline{\text{Standby}}$ signal, and the Shdn signal are provided by a controller 223 configured to operate switches of the programmable low Iq reference circuit 208A based on different operating modes (such as continuous-conduction mode, discontinuous-conduction mode, pulse-width modulation mode, pulse-skip mode and pulse-frequency modulation mode) or load conditions. In one example, with the Refresh signal and the $\overline{\text{Standby}}$ signals, S2 and S3 are closed during normal mode operations (e.g., during a normal load condition when the load 207 consistently draws a current) of the power stage 205. During low power mode of the power stage 205 (e.g., during a light load condition when the load 207 does not consistently draw a current), S2 and S3 are open to reduce Iq.

As shown in FIG. 3, the programmable low Iq reference circuit 208A includes an external voltage divider formed by R7 and R8, where R7 and R8 are coupled between the REF pin 244G and the AGND pin 244I. Between R7 and R8 is an internal node coupled to the VOprog 244H. Also, in the example embodiment of FIG. 3, the internal voltage divider 224, the comparator 228, the VREF source 210, the OR gate 304, and C2 are components of an active circuit 222 that is active in the low power mode.

In operation, the control IC 302 is configured to generate control signals at the LO pin 244A and the HO pin 244B based on the current detected through R6 (using the operational amplifier 234), the ramp signal 233, PWM signal 235 and the output of the error amplifier 226. A benefit of the control IC 302 relative to other switching converter controllers is a reduced Iq while also supporting a programmable VOUT using the external voltage divider formed by R7 and R8.

In the example embodiment of FIG. 3, VREF is connected to a pin and divided down with an external divider so that IC users can pick any output voltage in an analog fashion. With this example embodiment, the external divider voltage is based on VREF (e.g., ~1.2V) compared to a traditional VOUT divider (e.g., ~12-24V). Based on this difference, alone, the current in the external divider is reduced by greater than 10×. In addition, the current passing through this external divider is not multiplied by the boost ratio when reflected back to the VIN source 204. This effectively reduces the Vin current by greater than 20×. Unlike a divider on VOUT, the voltage on the VREF divider does not change over time, this allows use of a sample and hold technique to store the voltage value and hold it while shutting down VREF and the voltage divider 224 to further reduce Iq. To ensure leakage does not affect the control IC 302, the voltage divider 224 and the programmable low Iq reference circuit 208A can be engaged at a low duty cycle to refresh the charge on C2, which forms part of a sample-and-hold circuit with C2 and S3. Another benefit of programming the reference for the error amplifier 226 is having a natural VOUT tracking feature (through VOprog pin 224H) that is valuable to many customers.

To avoid restricting the VOUT dynamic programming range, in some examples, the REF pin 244G current is sensed on power-up. Based on the sensed current, a different divider ratio for the voltage divider 224 can be selected. More specifically, in the example embodiment of FIG. 3, a current sense winding 252 is positioned along between the VREF source 210 and the REF pin 244G. The current sense winding 252 is coupled to a detect circuit 250, which is configured to provide a control signal (Adjust) to the voltage divider 224 to change the divider ratio. The divider ratio programs VOUT within a given range (4× dynamic range), while the sum of the divider resistance programs the valid range. While not shown in FIGS. 2 and 4, similar components (e.g., a current sense winding 252 and a detect circuit 250) can be used to adjust the voltage divider 224 to enable different VOUT ranges.

In some example embodiments, there are two ranges: 1) Rdiv total (the total external voltage divider resistance) <50 kOhm and 5V<VOUT<20V; and 2) Rdiv total>50 kOhm and 15V<VOUT<60V. Table 1 shows the differences in current consumption for a boost converter with a conventional control IC (e.g., the control IC 102 of FIG. 1) versus control IC of an example embodiments (e.g., the control IC 202 of FIG. 2, the control IC 302 in FIG. 3, or the control IC 402 in FIG. 4)

TABLE 1

| Vin Current (5 V to 12 V boost) | Conventional Control IC | Control IC of Example Embodiments |
|---|---|---|
| FB divider Current | 264 uA (110 × 12/5) | 2.8 uA (1.2 × 12/5) |
| Chip Current | 15 uA | 10 uA |
| Total no load Current | 279 uA | 12.8 uA |

As shown in Table 1, the no load Iq current is reduced significantly for the control IC of the example embodiments relative to the conventional control IC.

Figure 4:
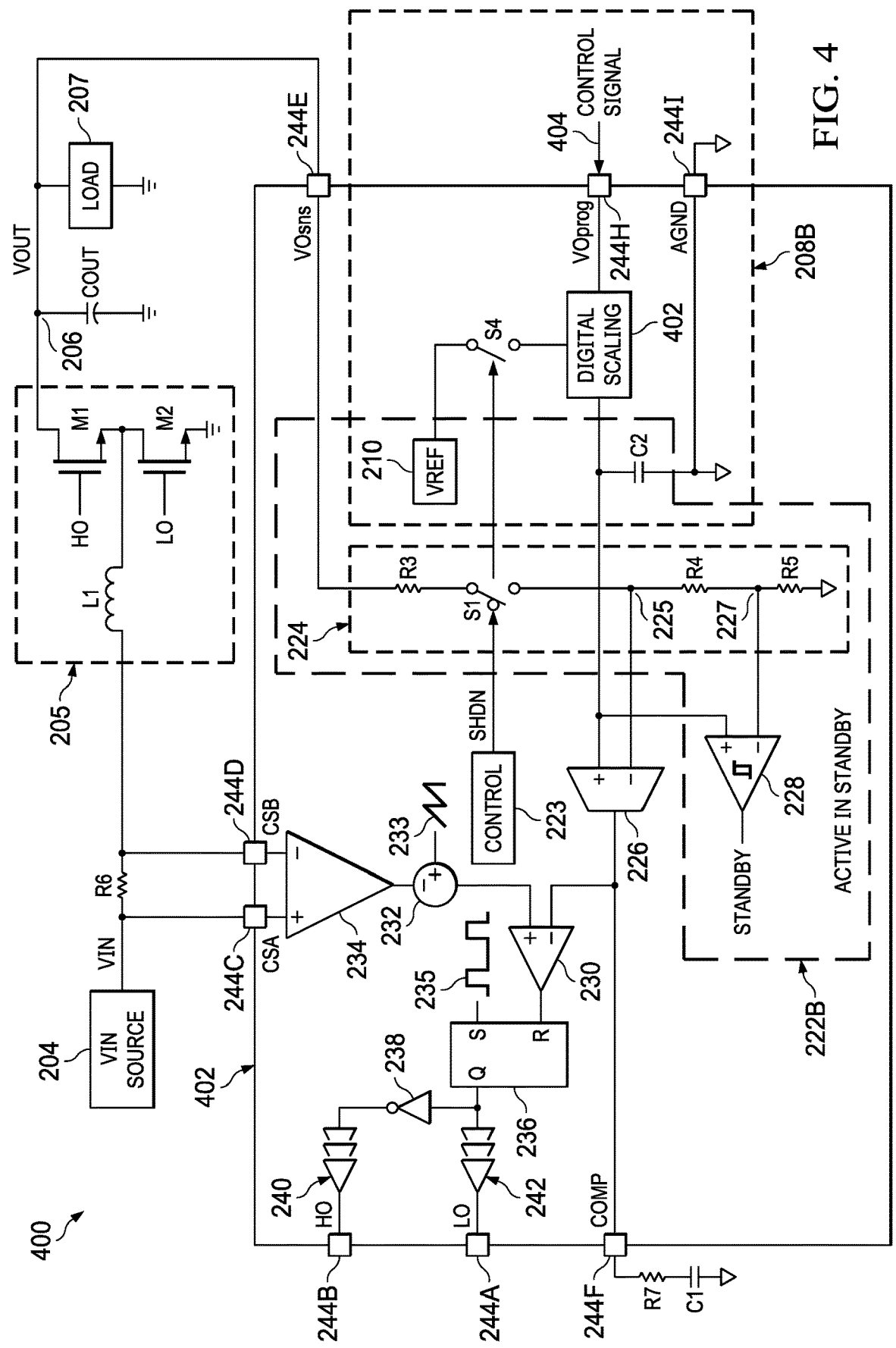
FIG. 4 is a diagram showing another system in accordance with an example embodiment.

FIG. 4 is a diagram showing another system 400 in accordance with an example embodiment. As shown, the system 400 includes a low Iq control IC 402 configured to provide control signals (HO and LO) to switches of the power stage 205. In FIG. 4, the power stage 205 corresponds to a boost converter power stage with L1, M1, and M2, where HO controls M1 and LO controls M2. In other example embodiments, the power stage 205 of FIG. 4 could have a buck converter topology, buck-boost converter topology, and/or another topology.

In the system 400 of FIG. 4, various other components external to the control IC 402 are represented such as the VIN source 204, COUT, and the load 207 described in FIG. 2. Also, the control IC 402 includes various components described for the control IC 202 of FIG. 2 such as the voltage divider 224, the error amplifier 226, the comparator 228, the operational amplifier 230, the combine circuit 232, the operational amplifier 234, the SR latch 236, the buffers 240 and 242, the inverter 238, the LO pin 244A, the HO pin 244B, the CSA pin 244C, the CSB pin 244D, the VOsns pin 244E, and the COMP pin 244F.

In the example embodiment of FIG. 4, the control IC 402 includes various components that are part of a programmable low Iq reference circuit 208B (an example of the programmable low Iq reference circuit 208 in FIG. 2). As shown, the programmable low Iq reference circuit 208B includes the VREF source 210 coupled to a digital scaling circuit 402 via a switch (S4). The programmable low Iq reference circuit 208B also includes the VOprog pin 244H, which is coupled to the digital scaling circuit 402. As shown, the VOprog pin 244H is configured to receive a digital control signal 404 that is used to control the digital scaling circuit 402. In the example embodiment of FIG. 4, the non-inverting input of the error amplifier 226 is coupled to an output of the digital scaling circuit 402. Capacitor C2 is connected between the non-inverting input of error amplifier 226 and a ground node. The programmable low Iq reference circuit 208B also includes the AGND pin 244I. In the example of FIG. 4, S4 is used to couple or decouple the VREF source 210 from the digital scaling circuit 402.

In the example embodiment of FIG. 4, S4 is used to coupled or decouple the VREF source 210 from the digital scaling circuit 402. In one example, S4 is controlled by a Refresh signal or a $\overline{\text{Standby}}$ signal (called a not standby signal, or an inverse standby signal) similar to S2 and S3 in FIG. 3. With the Refresh signal and the $\overline{\text{Standby}}$ signals, S4 is closed during normal mode operations (e.g., when the load 207 consistently draws a current) of the power stage 205. During low power mode operations of the power stage 205 (e.g., when the load 207 does not consistently draw a current), S4 is open to reduce Iq.

As shown in FIG. 4, the programmable low Iq reference circuit 208B uses the digital scaling circuit 402 instead of an external voltage divider (as in FIG. 3). Also, in the example embodiment of FIG. 4, the internal voltage divider 224, the comparator 228, the VREF source 210, and C2 are components of an active circuit 222B that is active in the low power mode.

In operation, the control IC 402 is configured to generate control signals at the LO pin 244A and the HO pin 244B based on the current detected through R6 (using the operational amplifier 234), the ramp signal 233, PWM signal 235) and the VOUT error output from the error amplifier 226. A benefit of the control IC 402 relative to other switching converter controllers is a reduced Iq while also supporting a programmable VOUT using the digital scaling circuit 402 and the digital control signal 404 received by the VOprog pin 244H.

In some example embodiments, a system (e.g., any of the systems 200, 300, or 400 in FIGS. 2-4) includes an input voltage source (e.g., the VIN source 204 in FIGS. 2-4). The system also includes a power stage (e.g., the power stage 205 in FIGS. 2-4) coupled to the input voltage source. The system also includes a load (e.g., the load 207 in FIGS. 2-4) coupled to an output node of the switching converter power stage. The system also includes a control circuit (e.g., any of the control ICs 202, 302, or 402 along with external components or signals for a programmable low Iq reference circuit as in FIGS. 2-4) coupled to the power stage and configured to generate control signal for switches of the power stage. The control circuit includes an IC (e.g., any of the control ICs 202, 302, or 402) having an error amplifier (e.g., the error amplifier 226 in FIGS. 2-4), a voltage divider (e.g., the voltage divider 224 in FIGS. 2-4) coupled to the output node (e.g., the output node 206 in FIGS. 2-4) and configured to provide an output voltage sense value to a first input of the error amplifier. The IC also includes a programmable reference voltage circuit (e.g., the programmable low Iq reference circuit 208 in FIG. 2, the programmable low Iq reference circuit 208A in FIG. 3, or the programmable low Iq reference circuit 208B in FIG. 4) with an output coupled to a second input of the error amplifier.

In some example embodiments, the programmable reference voltage circuit includes a reference voltage source (e.g., the VREF source 210 in FIGS. 2-4) and scaling circuit components (e.g., the internal scaling circuit components 218 or the external scaling circuit components 214 in FIG. 2, the voltage divider formed by R7 and R8 in FIG. 3, or the digital scaling circuit 402 in FIG. 4) between the reference voltage source and the second input of the error amplifier. The programmable reference voltage circuit also includes a switch (e.g., S2 and S3 in FIG. 3, or S4 in FIG. 4) between the reference voltage source and the second input of the error amplifier.

In some example embodiments, the scaling circuit components includes a first pin (e.g., the REF pin 244G in FIG. 3) configured to output, from the IC, a reference voltage provided by the reference voltage source. The scaling circuit components also include a second pin (e.g., the VOprog pin 244H in FIG. 3) configured to receive, into the IC, a scaled version of the reference voltage. In some example embodiments, the voltage divider (e.g., the voltage divider 224) is a first voltage divider, and wherein the control circuit further comprises a second voltage divider (e.g., R7 and R8 in FIG. 3) external to the IC, wherein the first pin is coupled to a first end of a first resistor (e.g., R7 in FIG. 3) of the second voltage divider, and wherein the second pin is coupled to a second end of the first resistor. In some example embodiments, the switch is a first switch (e.g., S3 in FIG. 3) between the reference voltage source and the first pin, and wherein the IC comprises a second switch (e.g., S4 in FIG. 3) between the second pin and the second input of the error amplifier.

In some example embodiments, the scaling circuit components include a digital scaling circuit (e.g., the digital scaling circuit 402 in FIG. 4) coupled to the voltage reference source and configured to scale a voltage reference provided by the voltage reference source based on a digital control signal (e.g., the digital control signal 404 in FIG. 4). The scaling circuit components also include a pin (e.g., the VOprog pin 244H in FIG. 4) coupled to the digital scaling circuit and configured to receive the digital control signal from an external source.

In some example embodiments, the IC further comprises a controller (e.g., the controller 223) coupled to the first switch and the second switch, wherein the controller is configured to operate the first and second switches based on an operating mode or load condition. In some examples, the IC includes a capacitor (e.g., C2 in FIGS. 2-4) with a first plate coupled to the second input of the error amplifier and with a second plate coupled to a ground node. In some examples, the programmable reference voltage circuit is configured to sample-and-hold a reference voltage provided by the reference voltage source, and wherein the programmable reference voltage circuit is configured to turn off the reference voltage source during a low power mode.

In some example embodiments, the control circuit includes a current sense circuit (e.g., the current sense winding 252 in FIG. 3) coupled to an output of the VREF source 210. The control circuit also includes a detect circuit (e.g., the detect circuit 250 in FIG. 3) coupled to the current sense circuit, where the detect circuit is configured to select different output voltage ranges based on a sensed current value provided by the current sense circuit. In some examples, the input voltage source comprises a battery, wherein the power stage has a boost topology, and wherein the load is an automotive circuit.

Certain terms have been used throughout this description and claims to refer to particular system components. As one skilled in the art will appreciate, different parties may refer to a component by different names. This document does not intend to distinguish between components that differ only in name but not in their respective functions or structures. In this disclosure and claims, the terms "including" and "comprising" are used in an open-ended fashion, and thus should be interpreted to mean "including, but not limited to . . . ."

The term "couple" is used throughout the specification. The term may cover connections, communications, or signal paths that enable a functional relationship consistent with the description of the present disclosure. For example, if device A generates a signal to control device B to perform an action, in a first example device A is coupled to device B by direct connection, or in a second example device A is coupled to device B through intervening component C if intervening component C does not alter the functional relationship between device A and device B such that device B is controlled by device A via the control signal generated by device A.

The above discussion is meant to be illustrative of the principles and various embodiments of the present invention. Numerous variations and modifications will become apparent to those skilled in the art once the above disclosure is fully appreciated.

What is claimed is:

1. A system having an input voltage source, a power stage coupled to the input voltage source, a load coupled to an output node of the power stage and a control circuit, the control circuit implemented on a semiconductor die and comprising:
    an error amplifier having a first input, a second input and an output;
    a voltage divider coupled to the output node and configured to provide an output voltage sense value to the first input of the error amplifier;
    a programmable reference voltage circuit with an output coupled to the second input of the error amplifier, the programmable reference voltage circuit includes:
    a reference voltage source;
    scaling circuit components between the reference voltage source and the second input of the error amplifier; and
    a switch between the reference voltage source and the second input of the error amplifier;
    and wherein the control circuit is coupled to the power stage and configured to generate a control signal for switches of the power stage.

2. The system of claim 1, wherein the scaling circuit components comprise:
    a first pin configured to output, from the IC, a reference voltage provided by the reference voltage source; and
    a second pin configured to receive, into the IC, a scaled version of the reference voltage.

3. The system of claim 2, wherein the voltage divider is a first voltage divider, and wherein the control circuit further comprises a second voltage divider external to the IC, wherein the first pin is coupled to a first end of a first resistor of the second voltage divider, and wherein the second pin is coupled to a second end of the first resistor.

4. The system of claim 2, wherein the switch is a first switch between the reference voltage source and the first pin, and wherein the IC comprises a second switch between the second pin and the second input of the error amplifier.

5. The system of claim 4, wherein the IC further comprises a controller coupled to the first switch and the second switch, wherein the controller is configured to operate the first and second switches based on an operating mode or load condition.

6. The system of claim 1, wherein the scaling circuit components comprise:
    a digital scaling circuit coupled to the reference voltage source and configured to scale a reference voltage provided by the reference voltage source based on a digital control signal; and
    a pin coupled to the digital scaling circuit and configured to receive the digital control signal from an external source.

7. The system of claim 1, wherein the IC further comprising a capacitor with a first plate coupled to the second input of the error amplifier and with a second plate coupled to a ground node.

8. The system of claim 7, wherein the programmable reference voltage circuit is configured to sample-and-hold a reference voltage provided by the reference voltage source, and wherein the programmable reference voltage circuit is configured to turn off the reference voltage source during a low power mode.

9. The system of claim 1, wherein the control circuit comprises:
a current sense circuit coupled to the output node of the power stage; and
an output voltage range selection circuit coupled to the current sense circuit and configured to select different output voltage ranges based on a sensed current value provided by the current sense circuit.

10. The system of claim 1, wherein the input voltage source comprises a battery, wherein the switching converter circuit has a boost topology, and wherein the load is an automotive circuit.

11. A switching converter circuit, comprising:
a power stage having an output and at least one switch, each of the at least one switch having a control terminal;
a control circuit having a control signal output coupled to the control terminal of each of the at least one switch, the control circuit comprises an integrated circuit (IC) having:
an error amplifier;
a voltage divider coupled to an output of the power stage and configured to provide an output voltage sense value to a first input of the error amplifier; and
a programmable reference voltage circuit with an output coupled to a second input of the error amplifier, wherein the programmable reference voltage circuit includes:
a reference voltage source;
scaling circuit components between the reference voltage source and the second input of the error amplifier; and
a switch between the reference voltage source and the second input of the error amplifier.

12. The switching converter circuit of claim 11, wherein the scaling circuit components comprise:
a first pin configured to output, from the IC, a reference voltage provided by the reference voltage source; and
a second pin configured to receive, into the IC, a scaled version of the reference voltage.

13. The switching converter circuit of claim 12, wherein the voltage divider is a first voltage divider, and wherein the control circuit further comprises a second voltage divider external to the IC, wherein the first pin is coupled to a first end of a first resistor of the second voltage divider, and wherein the second pin is coupled to a second end of the first resistor.

14. The switching converter circuit of claim 11, wherein the scaling circuit components comprise:
a digital scaling circuit coupled to the reference voltage source and configured to scale a reference voltage provided by the reference voltage source based on a digital control signal; and
a pin coupled to the digital scaling circuit and configured to receive the digital control signal from an external source.

15. The switching converter circuit of claim 11, wherein the programmable reference voltage circuit is configured to sample-and-hold a reference voltage provided by the reference voltage source, and wherein the programmable reference voltage circuit is configured to turn off the reference voltage source during a low power mode.

16. The switching converter circuit of claim 11, wherein the control circuit comprises:
a current sense circuit coupled to an output node of the power stage; and
an output voltage range selection circuit coupled to the current sense circuit and configured to select different output voltage ranges based on a sensed current value provided by the current sense circuit.

17. A control circuit integrated circuit (IC) for a switching converter, comprising:
an error amplifier;
a voltage divider coupled to a first input of the error amplifier; and
a programmable reference voltage circuit with an output coupled to a second input of the error amplifier, wherein the programmable reference voltage circuit includes:
a reference voltage source;
scaling circuit components between the reference voltage source and the second input of the error amplifier; and
a switch between the reference voltage source and the second input of the error amplifier.

18. The control circuit IC of claim 17, wherein the switch is a first switch, and wherein the scaling circuit components comprise:
a first pin coupled to the reference voltage source via the first switch; and
a second pin coupled to the second input of the error amplifier via a second switch.

19. The control circuit IC of claim 17, wherein the scaling circuit components comprise:
a digital scaling circuit coupled between the reference voltage source and the second input of the error amplifier; and
a pin coupled to control input of the digital scaling circuit.

20. The control circuit IC of claim 17, further comprising:
an output voltage sense pin
a current sense circuit coupled to the output voltage sense pin; and
an output voltage range selection circuit coupled to the current sense circuit.

* * * * *